C. J. VAN OSTRAND.
WATERING TROUGH.
APPLICATION FILED MAR. 5, 1910.

968,613.

Patented Aug. 30, 1910.

ATTEST
E. M. Fisher
J. C. Musson

INVENTOR
Clifton J. Van Ostrand
BY Fisher & Mover ATTYS.

UNITED STATES PATENT OFFICE.

CLIFFTON J. VAN OSTRAND, OF ASHLAND, OHIO, ASSIGNOR OF ONE-HALF TO W. B. SHRIVER, OF ASHLAND, OHIO.

WATERING-TROUGH.

968,613.     Specification of Letters Patent.     Patented Aug. 30, 1910.

Application filed March 5, 1910. Serial No. 547,527.

*To all whom it may concern:*

Be it known that I, CLIFFTON J. VAN OSTRAND, citizen of the United States, residing at Ashland, in the county of Ashland and State of Ohio, have invented certain new and useful Improvements in Watering-Troughs, of which the following is a specification.

My invention relates to an improvement in watering troughs for stock about a farm but more especially intended for watering sheep.

It is well known to those who raise sheep or are familiar with their peculiarities that of all animals about a farm they are most sensitive and particular about the water they drink, and that any sort of uncleanness in the water or accumulation of impurities which they can detect will render the water unacceptable and they will refuse entirely to drink it. Hence their watering troughs must not only be protected against foulness of every sort within, but also from catching impurities that may float in or otherwise be caused to gather on the surface of the water.

To these ends I have devised the improvement herein which serves all the purposes of a protector for watering troughs of this kind and also provides a trough which sheep are glad to patronize, as protracted tests have demonstrated.

To these ends the invention consists in the construction and combination of parts substantially as shown and described and particularly pointed out in the claims.

Figure 1:
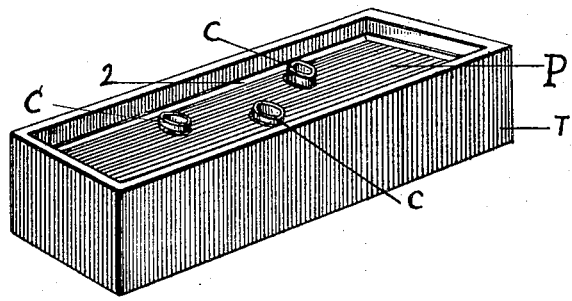
Figure 2:
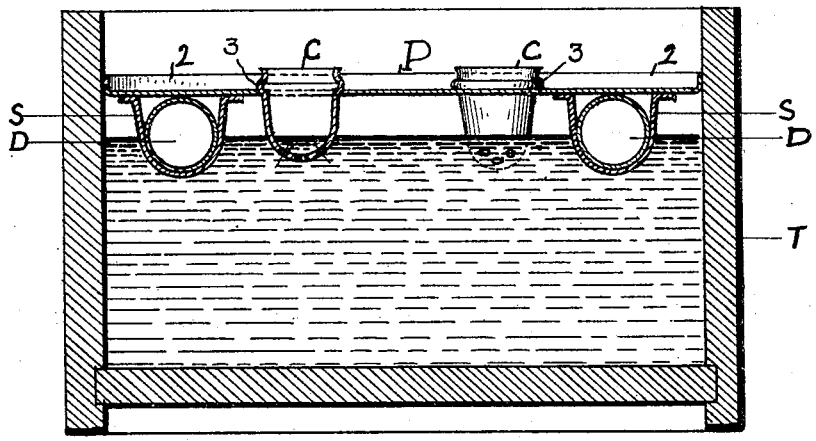

In the accompanying drawings, Figure 1 is a perspective view of a watering trough embodying my invention, and Fig. 2 is an enlarged cross sectional view thereof.

The construction as thus shown involves a rectangular trough, T, which may be of any preferred size and adapted to have water supplied thereto by a pipe from a source or head or merely to have the water pumped into the same or poured in by a pail or the like. So far as the trough alone is concerned I do not therefore claim any invention.

P represents what may be regarded as a cover for the trough, or rather for the water in the trough, for said cover is adapted to ride upon the water and rise and fall with it. To this end the said cover is of the nature of a float or floating cover, being buoyed up in this instance by suitable pipes or tubes D secured to the bottom of the cover by straps S engaged about the same and riveted to or soldered upon said cover at their ends. The said tubes preferably consist of very light galvanized sheet metal hermetically sealed at their ends and throughout their length and of a size or proportion to buoy or sustain the cover upon the water relatively as shown. Two or more pieces of tubing can be used for this purpose. The said cover likewise is made out of a relatively light weight of galvanized sheet metal and is flat from edge to edge and has its immediate edges 2 turned up a suitable depth so as to serve as guards at the sides of the trough to prevent leaves and flying particles of every kind from getting into the water. Otherwise the said plate or cover is solid throughout except as it has one or more holes cut therein for the cups C. Said holes may be round or oblong or any other suitable shape and of any desired size, because while this style of trough cover is intended mainly for use with sheep it is not necessarily limited to such use but may be adapted for cattle and stock more or less generally. The use to be made of the cover will therefore determine the size and shape of said holes, and cups C are placed in said holes and have perforations at their bottoms to admit the water from beneath the immediate surface thereof substantially as shown. Said cups are loose and removable and rest on beads 3 or the like, or they may have rims about their top to rest upon the plate.

Obviously any other means that will float plate P and work satisfactorily, or that will not become "water-logged", may be adopted in lieu of the air tight tubes D, but for endurance and cheapness I know of nothing better than the tubes shown.

What I claim is:

1. A cover for water in watering troughs consisting of a sheet of metal having upturned edges and one or more watering holes and means to buoy the cover upon the water.

2. A watering trough for stock and a cover adapted to be floated on the water provided with hermetically sealed sustaining tubes and having one or more holes therein, and removable cups in said holes perforated at their bottoms to admit water.

In testimony whereof I affix my signature in presence of two witnesses.

CLIFFTON J. VAN OSTRAND.

Witnesses:
R. B. MOSER,
F. C. MUSSUN.